Patented Feb. 10, 1942

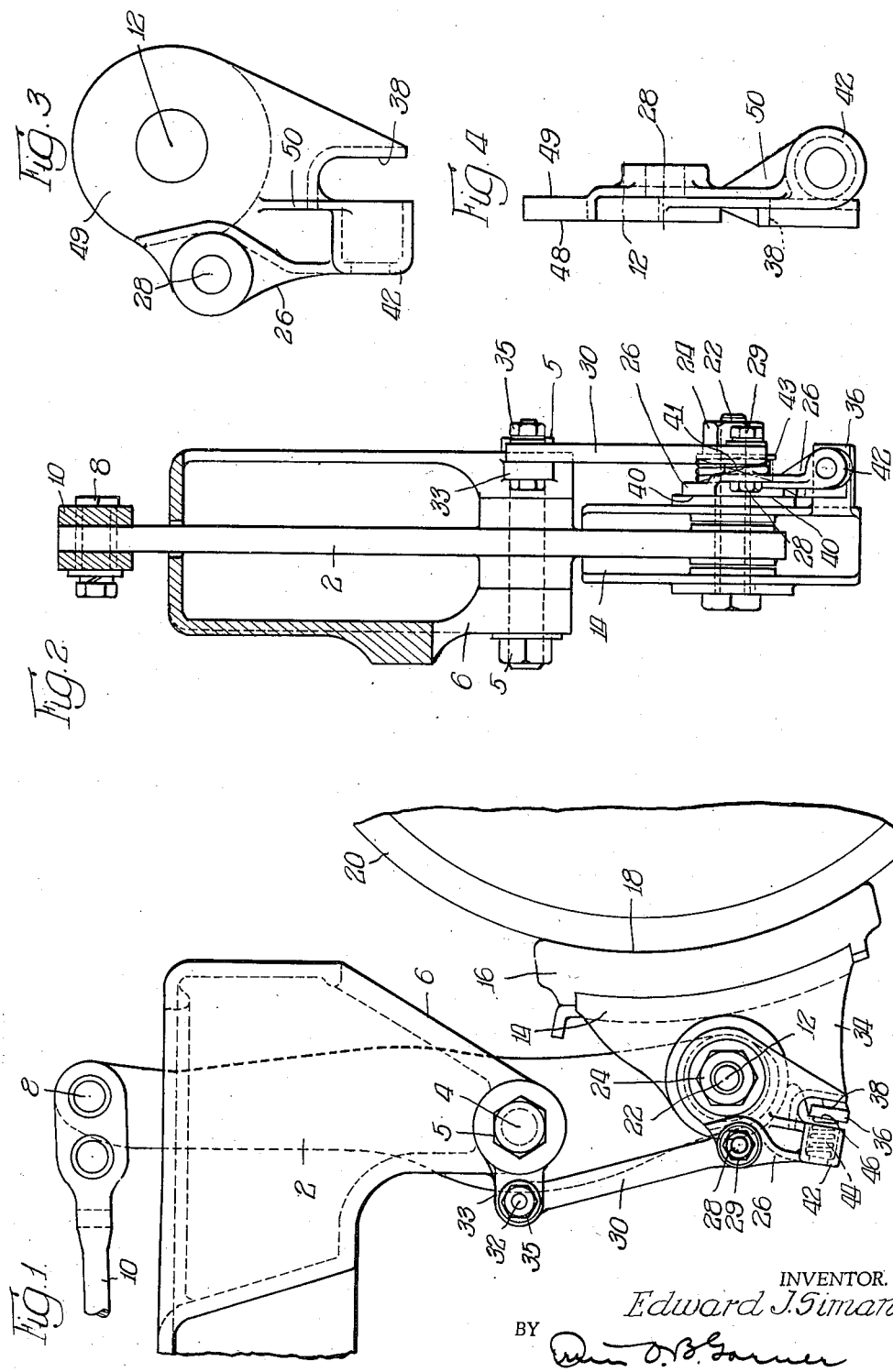

2,272,647

UNITED STATES PATENT OFFICE 2,272,647

BRAKE LEVER AND BRAKE SHOE

Edward J. Simanek, Chicago, Ill., assignor to American Steel Foundries, Chicago, Ill., a corporation of New Jersey Application October 24, 1940, Serial No. 362,632

16 Claims. (Cl. 188—230)

My invention relates to a brake rigging and more particularly to a novel form of supporting and balancing a brake head in association with the brake lever in such manner as to afford constant concentricity of the brake shoe with respect to the braking surface of the adjacent wheel.

It is common practice to mount a brake head on a brake lever using resilient means or friction means or a combination of the two in such manner as to permit limited rotation of the head and also to permit the head to adjust itself as necessary due to the wearing brake surface on the wheel as well as due to the wear of brake shoes mounted on the head.

Under certain conditions it is necessary to restrict within very accurate limits the play permitted the brake head in its rotational movements about its pivot point of support on the brake lever. I have devised a novel means of support and connection for a brake head which is adjustable to accommodate movement within such restricted limits and which will, at the same time, maintain the head in its necessary concentric position with respect to the adjacent braking surface of the wheel.

My novel device comprehends a parallelogram arrangement of support for the brake head in combination with a friction arm carrying resilient means in the form of a balance spring designed to control in some degree the movements of the brake head.

My invention comprehends a means of supporting and balancing the brake head from a spring or spring supported frame member, said head carrying a brake shoe for engagement with the usual unsprung wheel. In the usual application of brake supporting means to a railway car truck, the brakes are carried from some spring supported member of the truck frame while the brake shoe must engage the unsprung wheel and be maintained in normal concentricity therewith. My novel arrangement affords a convenient manner for restricting within close limits the play permitted a brake head in its rotational movements about its pivot point of support from the spring supported frame member, while at the same time permitting as much play as is normally required to accommodate the engagement of the brake shoe with the unsprung wheel.

Figure 1 is a side elevation of a portion of a brake rigging embodying my invention and in conjunction therewith is shown a fragmentary portion of an adjacent braked wheel.

Figure 2 is a fragmentary end elevation of the structure shown in Figure 1, the view being taken from the left as seen in Figure 1.

Figures 3 and 4 show in detail my novel form of friction arm, Figure 3 being a side elevation thereof and Figure 4 a view taken from the left as seen in Figure 3.

Describing the structure in detail, my novel arrangement comprises a brake lever 2 pivotally supported intermediate its ends as at 4 from the bracket 6 which may be integrally formed with a frame member of the associated car truck. The frame member from which the brake lever is supported is normally a spring supported portion of the car truck. Means for securing the lever 2 in the pivotal point 4 is in the form of the pin or threaded bolt 5. At the upper end of the lever 2 may be pivotally and adjustably connected as at 8 a pull rod 10 forming means for actuating said lever. At the lower end of the lever 2 may be pivotally connected as at 12 the brake head generally designated 14 affording the usual means of support for the brake shoe 16 arranged for braking engagement as at 18 with the periphery of the adjacent unsprung wheel designated 20. The bushed pin 22 forms the means of connection between the brake head 14 and the lever 2 at the pivotal point 12, said pin being secured in position by the nut 24 threaded on the outboard end thereof. Said pin 22 likewise forms the means of support for the friction arm and the spring housing 26, the detailed form of which is shown in Figures 3 and 4. The said friction arm 26 is afforded a pivotal connection as at 28 through the threaded bolt or pin 29 with the auxiliary hanger 30, the upper end of which has a pivotal connection as at 32 from the lug 33, integrally formed with the beforementioned frame bracket 6. Securing means for the hanger 30 at the pivot point 32 is in the form of the threaded bolt 35, said pivotal point of support 32 for the hanger being spaced from the pivotal point of support 4 of the lever such a distance as to afford approximately a parallelogram arrangement of the said pivot points 4 and 32 at the upper end of the structure with the pivot points 12 and 28 adjacent the lower end thereof.

By such an arrangement, pivotal movement of the hanger lever 2 about its point of support will also cause pivotal movement of the auxiliary hanger 30 about its point of support 32 so that the lower end of the hanger lever 2 and said auxiliary hanger 30 have parallel pivotal movement with each application or release of the brakes.

On the outboard face of the brake head 14 and adjacent the lower end thereof is formed the integral bracket 34, said bracket having at the rear thereof outwardly projecting stop means in the form of a stud or lug 36 of rectangular section, said stud extending transversely through the slot 38 of the friction arm 26, said slot being open at its lower end to accommodate the assembly of parts. The friction arm 26 is seated as at 40, 40 against the outboard face of the brake head and is frictionally maintained thereagainst by the compression spring diagrammatically shown at 41 (Figure 2), said spring being maintained under any desired degree of tension between the washer 43 and the friction arm 26, said tension being adjusted by manipulation of the threaded nut 24 on the end of the pin 22. Integrally formed with said friction arm is the spring housing portion 42 within which may be received the balance spring 44 which extends outwardly of said housing portion for abutment as at 46 against the side of the lug 36.

In the drawing, the brakes are shown in applied position with the brake shoe in engagement with the periphery of the wheel at 18 as already referred to. With each application of the brakes the parts, including the lever 2, the auxiliary hanger 30, the brake head 14, and the friction arm 26, are brought into the normal position shown in Figures 1 and 2. In such position the stud 36 on the brake head has compressed the balance spring 44 until said stud is supported approximately centrally within the slot 38. Upon release of the brake rigging the whole assembly, including the lever 2, the auxiliary hanger 30, the brake head and shoe, and the friction arm 26, fall away from the wheel but the concentricity of the head with the wheel is maintained within the small limits permitted by play of the parts and restricted as a maximum to the stop afforded by opposite sides of the slot 38 against which the stud 36 may seat. The balance spring 44 will be under compression at all times between the stud 36 on the side of the brake head and the housing 42 of the friction arm, but said friction arm is maintained against independent rotational movement about the pivot point 12 because of the connection of the auxiliary hanger 30 between the pivot point 28 and the point 32 on the frame bracket 6.

The detail of the friction arm is shown in Figures 3 and 4. Its pivotal point of securement at the lower end of the hanger lever 2 is shown at 12 and the pivot point of connection for the auxiliary hanger 30 is shown at 28. Said friction arm is afforded a smooth annular surface on its inboard face as at 48 for abutment with the brake head 14 as already described and on its outboard face a smooth annular surface as at 49 surrounding the pivot opening 12 and serving as a seat for the spring 41. Adjacent the lower end of said friction arm is formed the vertical slot 38 and adjacent said slot is formed the spring housing portion 42, already mentioned, said housing presenting its open end toward said slot. The juncture of the housing portion 42 with the main body of the friction arm casting is reinforced by the vertical rib 50.

To those skilled in the art, it will be clear that my novel arrangement will maintain a brake head and brake shoe in the desired concentric position with respect to the adjacent wheel within closely defined limits and within those limits will permit the adjustment of said brake head and brake shoe to accommodate the wear which takes place on the wheel and on the brake shoe and, likewise, to accommodate the changes of position made necessary because the frame from which the head is normally supported is usually a spring supported member while the wheel against which the brake shoe seats is always an unsprung member.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a frame member, a supporting wheel and axle assembly, a hanger lever pivotally supported intermediate its ends from said frame member, a brake head supported in the lower end of said lever with a brake shoe arranged for frictional engagement with the periphery of said wheel, a friction arm secured against said head at its point of support, interengaging means between said head and said arm limiting relative rotation thereof, and an auxiliary hanger connected in substantially parallel arrangement with said lever between said friction arm and said frame member.

2. In a brake arrangement, a frame member, a hanger lever pivotally supported therefrom intermediate its ends, a brake head pivotally supported at the lower end of said hanger, a lug on said brake head, a friction arm resiliently secured against the outboard face of said head at the pivotal point of support thereof, said friction arm having means engaging said lug to limit relative rotational movement between said head and said arm, and an auxiliary hanger pivotally connected between said arm and said bracket in parallel arrangement with said hanger lever.

3. In a brake arrangement, a frame member, a hanger lever pivotally hung intermediate its ends from said frame member, a brake head supported at the lower end of said lever, said head having a transversely extending member, a friction arm resiliently secured against said head at its point of support, means on said arm embracing said transverse member to limit relative rotational movement of said arm and said head, an auxiliary hanger connected between said arm and said frame member in substantially parallel arrangement with said lever, and a resilient member under compression between said arm and said lug.

4. In a brake arrangement for a railway car truck, a spring supported frame member, a hanger lever pivotally supported from said member, a brake head pivotally hung on said lever, a lug on said brake head, a friction arm secured against said brake head at its pivotal point of support with jaw means embracing said lug, an auxiliary hanger pivotally connected at its lower end to said friction arm and at its upper end to said bracket, and a balance spring supported in said friction arm for engagement with said lug.

5. In a brake arrangement, a frame member, a hanger lever pivotally supported therefrom intermediate its ends, a brake head pivotally supported at the lower end of said hanger, a lug on said brake head, a friction arm resiliently secured against the outboard face of said head at the pivotal point of support thereof, said friction arm having a jaw embracing said lug to limit relative rotational movement between said head and said arm, and an auxiliary hanger pivotally connected between said arm and said member.

6. In a brake arrangement, a frame member, a hanger lever pivotally hung intermediate its ends from said frame member, a brake head supported at the lower end of said lever, said head having a transversely extending lug, a friction arm resiliently secured against said head at its point of support, means on said arm embracing said lug to limit relative rotational movement of said arm and said head, and an auxiliary hanger connected between said arm and said frame member in substantially parallel arrangement with said lever.

7. In a brake arrangement for a railway car truck, a sprung member, an unsprung wheel, a lever hung intermediate its ends from said sprung member and supporting at its lower end a brake head with a brake shoe for engagement with said wheel, a friction arm secured against said brake head at its point of support, interengageable means between said brake head and said arm limiting relative rotation thereof, and a hanger connected between said arm and said sprung member in substantially parallel arrangement with said lever.

8. In a brake arrangement for a railway car truck, a frame member, a hanger lever pivotally supported from said member, a brake head pivotally hung on said lever, a lug on said brake head, a friction arm secured against said brake head at its pivotal point of support with jaw means embracing said lug, and an auxiliary hanger pivotally connected at its lower end to said friction arm and at its upper end to said bracket.

9. In a brake arrangement, a frame member, a hanger lever pivotally hung intermediate its ends from said frame member, a brake head supported at the lower end of said lever, said head having stop means, a friction arm resiliently secured against said head at its point of support, means on said arm engaging said stop means to limit relative rotational movement of said arm and said head, and an auxiliary hanger connected between said arm and said frame member.

10. In a brake arrangement, support means, a brake lever hung at an intermediate point therefrom, a brake head mounted at the lower end of said lever, a friction arm secured against said head, interengaging means on said arm and said head limiting relative rotational movement thereof, and an auxiliary hanger connected between said arm and said support means in substantially parallel arrangement with said lever.

11. In a brake arrangement, a sprung member, an unsprung wheel, a lever fulcrumed from said member and supporting a brake head, a transverse member on said head, a friction arm resiliently secured against said head with means engaging said transverse member to limit relative rotation of said head and said arm, and a rigid connection between said arm and said member in parallel arrangement with said lever.

12. In a brake arrangement, a spring supported frame member, an unsprung wheel, a lever supported from said member, a brake head pivotally mounted on said lever with a brake shoe engaging said wheel, a friction arm secured against said head, interengaging means on said arm and said head limiting relative rotation thereof, and a hanger connected between said friction arm and said frame member.

13. In a brake arrangement, a spring supported member, an unsprung wheel, a brake lever fulcrumed from said member and supporting a brake head with a brake shoe for engagement with said wheel, a friction arm resiliently secured against said head, interengaging means on said arm and said head limiting relative rotational movement thereof, and rigid means connected between said arm and said member.

14. In a brake arrangement, a frame member, a lever supported therefrom, a brake head pivotally mounted on said lever, a friction arm secured against said head at its point of support, interengaging means on said friction arm and said head limiting relative rotation thereof, and a hanger connected between said friction arm and said frame member in parallel arrangement with said lever.

15. In a brake arrangement, support means, a brake lever hung at an intermediate point therefrom, a brake head mounted at the lower end of said lever, a friction arm secured against said head, interengaging means on said arm and said head limiting relative rotational movement thereof and an auxiliary hanger connected between sair arm and said support means.

16. In a brake arrangement, a frame member, a lever supported therefrom, a brake head pivotally mounted on said lever, a friction arm secured against said head at its point of support, interengaging means on said friction arm and said head limiting relative rotation thereof, and a hanger connected between said friction arm and said frame member.

EDWARD J. SIMANEK.